Feb. 25, 1936. H. SMITH ET AL 2,031,742
SELF ADJUSTING BRAKE
Filed Dec. 28, 1931 2 Sheets-Sheet 1

Hugh Smith,
Joseph Schiedel,
Arthur B. Asbury,
INVENTORS

BY Bean, Brooks + Henry
ATTORNEYS

Feb. 25, 1936. H. SMITH ET AL 2,031,742
SELF ADJUSTING BRAKE
Filed Dec. 23, 1931 2 Sheets-Sheet 2
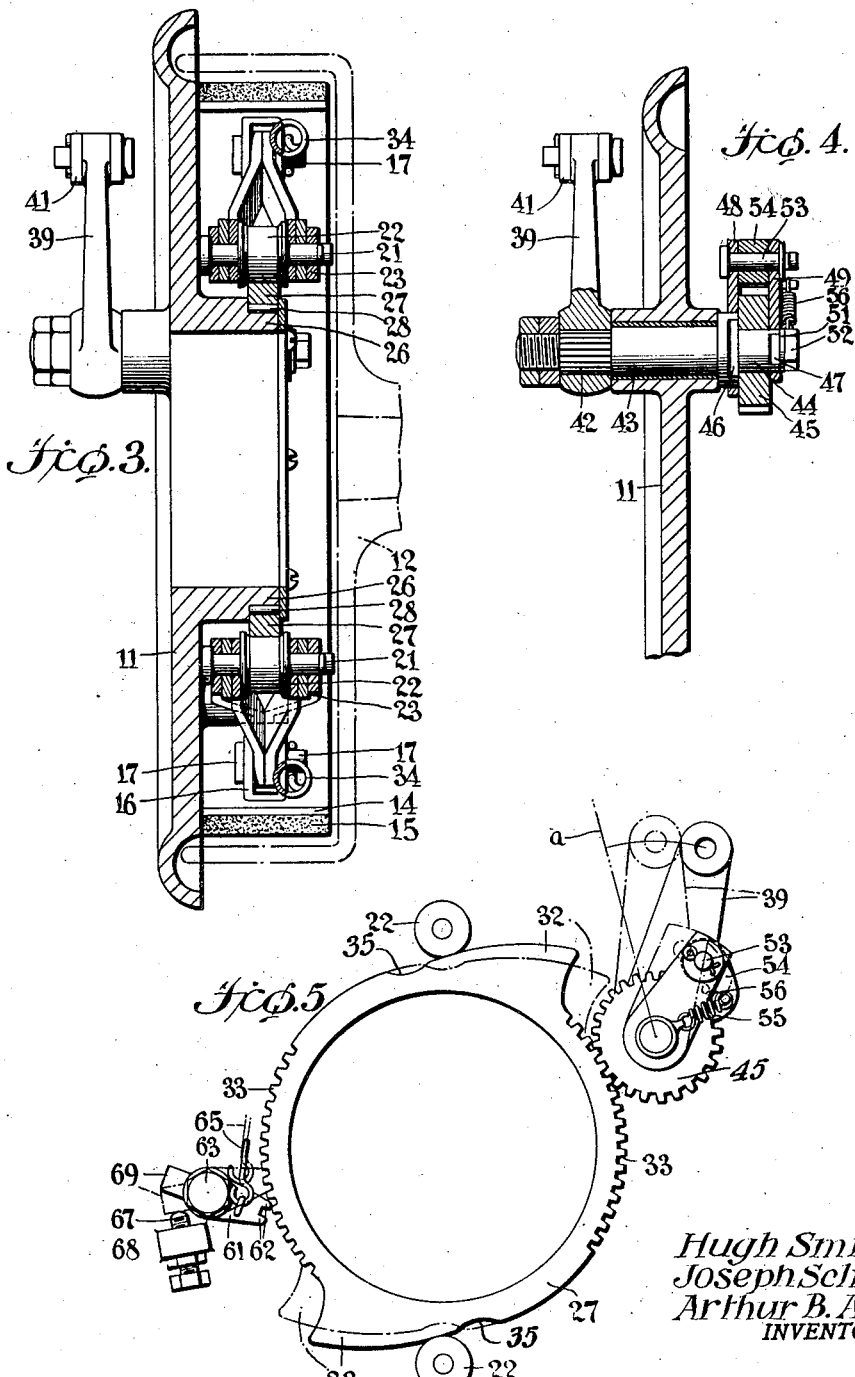
Hugh Smith,
Joseph Schiedel,
Arthur B. Asbury,
INVENTORS
BY Bean, Brooks + Henry
ATTORNEYS Patented Feb. 25, 1936

2,031,742

UNITED STATES PATENT OFFICE 2,031,742

SELF-ADJUSTING BRAKE

Hugh Smith, Buffalo, Joseph Schiedel, Hamburg, and Arthur B. Asbury, Buffalo, N. Y.

Application December 28, 1931, Serial No. 583,444

20 Claims. (Cl. 188—79.5)

Our invention relates to brakes and particularly to brakes especially adapted for use on vehicles.

Generally, the invention contemplates an improved actuating mechanism for maintaining a predetermined clearance between the band or shoe members and the drum, in order that braking action will result from substantially the same degree of movement of the brake actuating pedal, or other operating element, regardless of the degree of wear of the drum or brake lining. Further, the invention provides means whereby the predetermined clearance between the band or shoe and the drum may be adjusted, thereby rendering the device adaptable to various operating conditions and to the manner of operation preferred by any particular operator.

These and other objects and advantages, including those inherent in the formation and arrangement of parts, will become apparent from the following description of one typical embodiment of the invention shown in the accompanying drawings, wherein:

Fig. 3 is a vertical section taken along line 3—3 of Fig. 1;

Fig. 4 is a fragmentary sectional view taken along line 4—4 of Fig. 1; and

Fig. 5 is a fragmentary side elevation depicting parts of the actuating mechanism in different phase relationships which they may occupy.

Figure 1:
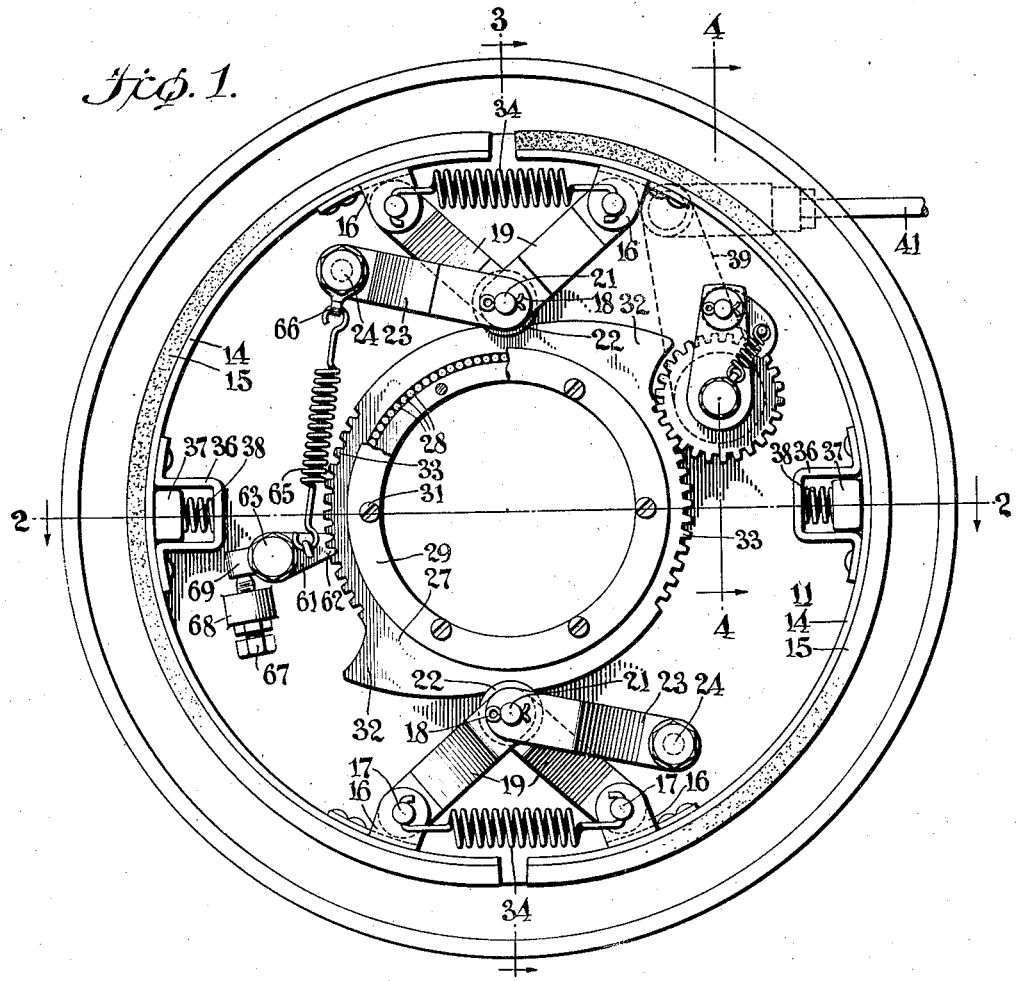
Fig. 1 is a side elevation of a brake device embodying the principles of the invention, the drum being omitted.
Figure 2:
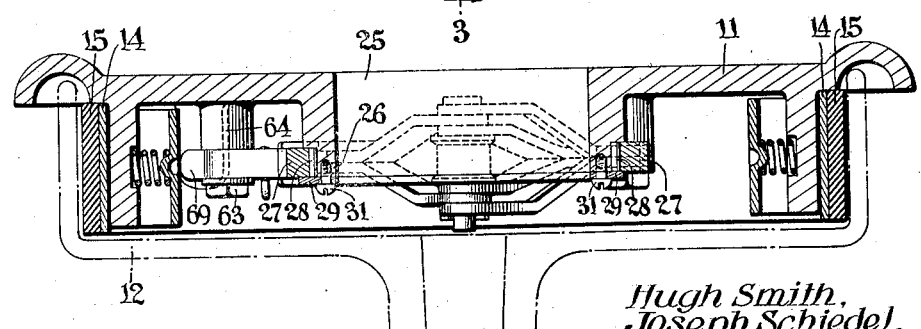
Fig. 2 is a horizontal section taken on line 2—2 of Fig. 1, the drum being indicated in broken lines.

As shown in the drawings, wherein a brake of the internal expanding shoe type is illustrated, a backing plate 11 is provided which may be fixed relative to a non-rotatable vehicle axle, axle housing, or equivalent part, and a drum 12 attachable to a wheel or rotatable shaft or axle. Disposed within the drum is a pair of brake band or shoe members 14 carrying brake lining 15 and having U-brackets 16 adjacent the ends of each shoe. As shown in Fig. 1 the ends of the shoes and lining are radially inset in order to prevent stripping of the lining from the shoes at these points. Toggle links 19, each comprising a pair of diverging link sections, as shown in Fig. 3, have outer ends received in the U-brackets 16 and pivoted thereto by pins 17, which extend through the legs of the U-brackets. The pins are retained by suitable means such as the cotter pins 18.

The inner ends of the links 19 of each pair are pivotally connected by a pin 21, which carries a flanged roller 22, the latter being disposed between the diverging link sections. Guide links 23, each of which also comprises a pair of diverging arm sections, have their inner ends pivoted to the toggle links 19 and rollers 22, by the pivot pins 21. The opposite ends of guide links 23 are pivoted at 24, in any suitable manner, to backing plate 11.

Backing plate 11 has a central hub 25 with a reduced end 26 carrying a rotatable ring member 27, rollers 28 preferably being disposed between the bore of member 27 and the periphery of hub portion 26. The rollers and rotatable ring member are retained by a fixed ring 29 secured to the hub by screws 31. At its periphery the rotatable ring member is provided with a pair of cam lobes 32, one for engaging each roller 22, and between the lobes are gear teeth 33. Upon rotation of the ring or cam member 27, in a counter-clockwise direction, as the device is viewed in Figs. 1 and 5, the rollers 22 and the inner ends of the toggle links 19 will be moved outwardly, thereby spreading the inner ends of the toggle links and moving the shoes 14 radially, toward the drum 12. Springs 34, connecting the pins 17 of each toggle link assembly, normally urge the toggles to the position shown in Fig. 1, the inward pressure of the rollers 22 upon the cam surfaces being effective to rotate the cam member 27 in a clockwise direction to the position shown in Fig. 1. The cam surfaces preferably terminate in depressions 35, in the periphery of member 27, which prevents clockwise movement of the cam beyond the position shown.

Bails 36, secured to medial portions of the shoes 14, receive ears 37 which are extended from backing plate 11. Disposed and acting between the bails and ears are coil springs 38 which function to urge the shoes 14 away from the drum, assisting the springs 34 in this respect. The lugs 37 function further to prevent the shoe and toggle assembly from dropping, with respect to the drum, and thereby dragging upon the drum. Sufficient clearance is provided between the lugs and bails to allow for the slight clockwise movement of the shoes occasioned by movement of the links 23 when the cam 27 is rotated.

The brake is actuated by a lever 39, which may be connected by suitable operating linkage extending from and including a rod 41. The lever is splined to a shaft 43, as shown in Fig. 4 at 42, the shaft being journalled in and extending through backing plate 11. The inner end of shaft 43 is reduced at 44 for rotatably mounting a pinion 45 having teeth meshing with teeth 33 on the ring cam member 27. On opposite sides of portion 44 of the shaft are non-circular portions 46 and 47, engaging lever arms 48 and 49 respectively, the pinion and arms being retained on the shaft by a washer 51 and nut 52. A pin 53, extended between the free ends of the arms 48 and 49, carries a pawl 54 having tooth 55. The pawl is normally retained with its tooth in mesh with the pinion teeth by a spring 56 connected to the pawl and to the washer 51.

In conventional vehicle brake systems, means are provided for returning the brake pedal and connected operating linkage to a normal inoperative position when pressure on the pedal is released. With the present brake device, it will be understood that when pressure is applied to a foot pedal or other control member to move lever 39 in a clockwise direction, or to the right as viewed in Fig. 1, the shaft 43, ratchet 54 and pinion will move as a unit therewith about the axis of the shaft, thereby moving cam 27 in a counter-clockwise direction to produce outward radial movements of the shoes 14. Upon release of braking pressure the arm 39, shaft 43 and ratchet arms 48 may return to normal position independently of pinion 45, the ratchet 54 permitting of such movement. Normally, however, the pinion will be returned by action of the springs 34 and 38 as heretofore described.

In order to maintain proper clearance between the shoes and drum, or to automatically adjust such clearance, a second ratchet pawl, 61, having teeth 62 engaging teeth 33 of the cam, is pivoted to the backing plate. The pivotal connection may comprise a screw 63 extending through the pawl 61 and secured to a boss 64 on the backing plate. Clockwise movement of the pawl is resisted by a spring 65 which resiliently connects it to a relatively fixed part, as illustrated by the member 66 carried by the upper pin 24. Counter-clockwise movement of the pawl is limited by an adjustable set screw 67, threaded through an ear 68 on the backing plate for engagement with lug 69 of the pawl.

In applying the brake, the cam ring 27 will be moved counter-clockwise, as viewed in Figs. 1 and 5, as heretofore described, and such movement will rotate the pawl 61 until the position shown in full lines in Fig. 5 is reached, after which the pawl teeth will be disengaged from the cam teeth 33 during further counter-clockwise rotation of the latter. Upon release of the brake, the parts will return as heretofore described, and the pawl will immediately, upon commencement of return movement of the cam ring, again engage teeth 33. Return movement of the cam ring is accordingly limited to the distance traveled by the pawl in return movement until stopped by engagement of lug 69 with the set screw 67.

After the lining on the brake shoes, or the drum, becomes worn, the first application only of the brake will require greater than normal movement of the pinion 45, due to the increased clearance. Upon return to normal position the cam 27 will not return to its initial position but will return only as permitted by the return movement of the pawl 61, although by reason of the pawl 54, the actuating lever 39 and shaft 43 may return to their initial positions. The degree of clearance thus maintained by the pawl 61 may be adjusted, to suit the operating conditions and the preference of the operator, by adjusting the set screw 67.

The self-adjusting operation of the brake may be clearly perceived from a study of Fig. 5, which in full lines depicts the parts as they are upon the first brake application if undue clearance exists between the drum and shoes, the lever 39 having been moved from the normal position, indicated by center line a to the full line position where the brake is fully applied, this movement being relatively greater than the movement which the pawl 61 has made. Upon release of the brake, the cam ring 27 will return to the dotted line position wherein it is locked against further clockwise movement by reason of lug 69 of the pawl abutting the set screw 67. The arm 39, however, by reason of ratchet pawl 54 disengaging the pinion teeth, may continue its return movement past the broken line position to its initial position represented by center line a. Spring 56 will prevent disengagement of cam ratchet 54 until lever 39 reaches the broken line position.

As clearly depicted in Fig. 5, the pawl 54 is pivoted to the actuating arm at a point beyond the periphery of pinion 45, so that the line between the pivot point and tooth 55 of the pawl forms an obtuse or greater than 90° angle with a radial line between the axis of pinion 45 and tooth 55. By reason of this arrangement, the pawl, if moved in a counter-clockwise direction about the pinion axis, as the device is viewed in Fig. 5, will not positively engage or carry with it the pinion but is enabled to move out of engagement with the pinion teeth. However, clockwise movement of the pawl will press tooth 55 of the pawl into firmer engagement with the teeth of the pinion, causing the pawl and pinion to move as a unit.

It will be understood that the ratchet pawl 61 will permit unrestricted rotational movement of the eccentric element in a counter-clockwise direction, as the device is viewed in Fig. 5, but will positively stop movement in the opposite direction after a predetermined travel of the eccentric element. In other words, the ratchet mechanism effective between the backing plate 10 and eccentric element 27 constitutes lost motion ratchet means for automatically limiting return movement of the eccentric element to a position a predetermined degree from the most advanced position reached during brake-applying movement.

By reason of the maintenance of a predetermined clearance between the shoes and drum, and the return of the actuating lever 39 and shaft 43 to their initial positions after each brake application, regardless of the degree of wear of the lining or drum, it will be understood that a greater mechanical advantage may be provided between the brake pedal to render operation easier, without increasing the degree of pedal throw customarily provided, since no provision need be made for wear of the braking parts.

It will be further understood that the particular embodiment herein described and illustrated is merely illustrative of the inventive principles involved, which may be utilized to advantage in other brake devices having other structural characteristics and arrangements of parts, all within the purview of this invention.

What is claimed is:

1. In a brake, a drum and a member movable toward or away from the drum into or out of braking engagement therewith, an element rotatable in one direction for moving the member into braking engagement, an actuating element movable to rotate the rotatable element in said one direction, teeth carried by said rotatable element, a pivoted pawl having a tooth engageable with said teeth, resilient means for urging movement of said pawl to rotate said rotatable element in a direction opposite to said one direction, and means for limiting said movement of the pawl, said last mentioned means being manually adjustable to vary the limits of movement of the pawl.

2. In a brake, a drum and a member movable toward or away from the drum into or out of braking engagement therewith, an element rotatable in one direction for moving the member into braking engagement, an actuating element movable to rotate the rotatable element in said one direction, teeth carried by said rotatable element, a pivoted pawl having a tooth engageable with said teeth, resilient means for urging movement of said pawl to rotate said rotatable element in a direction opposite to said one direction, and means for limiting said movement of the pawl.

3. In a brake, a drum and a member movable toward or away from the drum into or out of braking engagement therewith, means including an eccentric element to move the member into braking engagement, said eccentric being rotatable in one direction to effect movement of the member into said braking engagement, an actuating element for rotating the eccentric element in said one direction, teeth carried by said eccentric element, a pivoted pawl having a tooth engageable with said teeth, resilient means for urging movement of said pawl to rotate said eccentric in a direction opposite to said one direction, and means for limiting said movement of the pawl.

4. In a brake, a drum and a member for braking engagement with the drum, means including an eccentric element movable in one direction to move the member into braking engagement and movable in the opposite direction to move the member from braking engagement, an actuating element movable from normal position for rotating the eccentric element in said one direction, means permitting the actuating element to return to normal position free of said eccentric, means for rotating said eccentric in said opposite direction, and lost motion ratchet means for limiting the degree of movement of said eccentric in said opposite direction.

5. In a brake, a drum and a member for braking engagement with the drum, means including an eccentric element movable in one direction to move the member into braking engagement and movable in the opposite direction to move the member from braking engagement, an actuating element movable from normal position for rotating the eccentric element to an advanced position in said one direction, means for rotating said eccentric in said opposite direction, and means for limiting the movement of said eccentric in said opposite direction to a predetermined degree from the preceding most advanced position.

6. In a brake, a drum and a member for braking engagement with the drum, means including an eccentric element rotatable in one direction to move the member into braking engagement and rotatable in the opposite direction to move the member from braking engagement, an actuating element movable from normal position for rotating the eccentric element in said one direction to an advanced position, means permitting the actuating element to return to normal position free of said eccentric, means for rotating said eccentric in said opposite direction, and lost motion ratchet means for limiting the movement of said eccentric in said opposite direction to a predetermined degree from the preceding most advanced position.

7. In a brake, a drum and a member movable toward or away from the drum into and out of braking engagement therewith, actuating means movable from a normal position for moving the member into braking engagement, means permitting the actuating means to return to normal position free of the member, means for moving the member away from the drum, means for automatically limiting the movement of said member away from the drum to a position a predetermined distance from said drum, said means being manually adjustable to vary said predetermined distance.

8. In a brake, a drum and a member for braking engagement with the drum, actuating means movable from a normal position for moving the member into braking engagement, means permitting the actuating means to return to normal position free of the member, and means for automatically limiting the movement of said member away from braking engagement with the drum to a position a predetermined distance from the position of braking engagement, said means being manually adjustable to vary said predetermined distance.

9. In a brake, a drum, a cam rotatable about an axis substantially concentric with said drum and having a cam lobe, a pair of brake shoes disposed end to end within the drum, a link pivoted to the adjacent ends of the shoes of said pair, said links being pivotally connected to the connected ends of the links lying within the path of rotation of the cam lobe, a relatively fixed backing plate and a link pivoted to the backing plate and pivoted to said first mentioned links adjacent their pivotal connection, whereby upon rotation of the cam relative to the backing plate said shoes will be moved toward said drum.

10. In a brake, a drum and an element movable toward or away from the drum into or out of braking engagement therewith, means including a rotatable member having teeth thereon for moving said element into braking engagement, an actuating element, a second rotatable member having a series of teeth about the periphery thereof engageable with the teeth of the first member, and a pawl carried by said actuating member and engageable with said series of teeth on said second rotatable member.

11. In a brake, a drum and a shoe movable toward or away from the drum into or out of braking engagement therewith; means for moving the shoe into braking engagement including a rotatable member having a series of gear teeth thereon; an element movable about an axis substantially coincident with the axis of the rotatable member; a pawl pivoted to said element and engageable with said series of teeth; said pawl being so related to the element and rotatable member that the included angle between the pivotal axis of the pawl, the portion of the pawl engaged with the teeth, and said first mentioned axis is greater than 90°.

12. In a brake, a drum, a hub within and concentric with said drum, a cam member rotatable on said hub having a plurality of cam lobes, a plurality of brake shoes disposed end to end within the drum, a link having one end pivoted to each end of each shoe, a pin extending through and connecting the opposite ends of adjacent links, a roller carried by each pin and rotatable about the axis thereof, said rollers lying within the path of rotation of the cam lobes, whereby upon rotation of said cam member, said shoes will be moved toward said drum.

13. In a brake, a drum, a backing element, and a member for breaking engagement with the drum, means including an eccentric element rotatable in one direction relative to the backing element to move said member into braking engagement, an actuating element movable from a normal position for rotating the eccentric element in said one direction, means for rotating said eccentric in the opposite direction relative to the backing element and lost motion ratchet mechanism effective between the backing element and eccentric element permitting unrestricted rotational movement of the eccentric element in said one direction and for automatically limiting the movement of said eccentric element in said opposite direction to a position a predetermined degree from the most advanced position during movement in said one direction.

14. In a brake, a drum, a backing element, and a member for braking engagement with the drum, means including an eccentric element rotatable in one direction relative to the backing element to move said member into braking engagement, an actuating element movable from a normal position for rotating the eccentric element in said one direction, means for permitting the actuating element to return to normal position free of the eccentric element, means for rotating said eccentric element in the opposite direction relative to the backing element, and a lost motion ratchet mechanism effective between the backing element and eccentric element for permitting unrestricted rotational movement of the eccentric element in said one direction and for automatically limiting the movement of said eccentric element in said opposite direction to a position a predetermined degree from the most advanced position during movement in said one direction.

15. In a brake, a drum and a member for braking engagement with the drum, a cam rotatable in one direction to move said member into braking engagement and rotatable in the opposite direction to release said member from braking engagement, a detent co-operating with said cam to limit adjustably its rotation in said opposite direction, mechanism for rotating said cam, and a take-up device associated with said mechanism and co-operating with said detent for the automatic adjustment of said brake.

16. In a brake, a drum, a backing element, and a member for braking engagement with the drum, a ring mounted for rotation about an axis concentric with the drum and having a cam face for effecting movement of said member into braking engagement upon rotation of the ring in one direction, actuating means movable in one direction for rotating the ring in said one direction and movable in the opposite direction free of said ring, means for effecting rotation of the ring in said opposite direction, and lost motion ratchet detent engaging the ring for permitting movement of the ring in said one direction and for restricting movement of the ring in the opposite direction to a position at least a predetermined degree from the most advanced position of the ring reached during maximum movement in said one direction, said predetermined degree being sufficient to release said member from braking engagement with the drum.

17. In a brake, a cam movable in one direction to an advanced position to apply the brake and movable in return in the opposite direction to release the brake, a ratchet device associated with the cam and permitting movement of the cam in said one direction and preventing extended movement thereof in said opposite direction, said ratchet device having a substantial degree of lost motion for at all times enabling movement of said cam in said opposite direction from an advanced position to release the brake, and actuating means movable from a normal position for moving the cam in said one direction and having a ratchet connection with the cam, whereby said actuating means may return to said normal position regardless of the degree of return of said cam.

18. In a brake, a cam movable in one direction to an advanced position to apply the brake and movable in return in the opposite direction to release the brake, a ratchet device associated with the cam and permitting movement of the cam in said one direction and preventing extended movement thereof in said opposite direction, said ratchet device having a substantial degree of lost motion for at all times enabling movement of said cam in said opposite direction from an advanced position to release the brake.

19. In a brake, a drum and a member for braking engagement with the drum, a cam rotatable in one direction to move said member into braking engagement and rotatable in the opposite direction to release said member from braking engagement, mechanism for rotating said cam in both directions, and a detent cooperative with said cam to limit movement of the cam in brake-releasing direction, the effect of said detent being variable upon increased movement of the cam in braking direction to vary the limitation to brake releasing movement of the cam.

20. A brake in accordance with the combination of claim 19 in which the mechanism for rotating the cam comprises a take-up device arranged to accommodate the action of said mechanism in accordance with varied limitation to brake releasing movement of the cam.

HUGH SMITH.
JOSEPH SCHIEDEL.
ARTHUR B. ASBURY.